United States Patent
Korpel

[11] 3,931,459
[45] Jan. 6, 1976

[54] VIDEO DISC

[75] Inventor: Adrianus Korpel, Prospect Heights, Ill.

[73] Assignee: Zenith Radio Corporation, Chicago, Ill.

[22] Filed: Feb. 4, 1974

[21] Appl. No.: 439,680

[52] U.S. Cl.. 178/6.6 A; 178/6.6 DD; 179/100.3 V; 179/100.3 G
[51] Int. Cl.²... G11B 7/24; H04N 1/00; H04N 3/02
[58] Field of Search... 179/100.3 G, 100.3 V, 100.3 B, 179/100.4 A, 100.4 C; 178/6.7 A, 178/6.6 A, 6.6 DD

[56] References Cited
UNITED STATES PATENTS

| | | | |
|---|---|---|---|
| 3,361,873 | 1/1968 | Johnson et al. | 179/100.3 V |
| 3,688,025 | 8/1972 | Whittemore, Jr. | 179/100.3 G |

OTHER PUBLICATIONS

The Optical Scanning System of the Philips 'VLP' Record Player by Bouwhuis & Burgstede, Philips Tech. Rev. 33, No. 7, Oct. 1973 pp. 186–189.
Eduology, Vol. 4, Issue 1, 1973, On Printing Motion by P. Kramer and K. Compaan.

*Primary Examiner*—James W. Moffitt
*Assistant Examiner*—Stewart Levy
*Attorney, Agent, or Firm*—John J. Pederson; Cornelius J. O'Connor

[57] ABSTRACT

A video disc for an optical image reproducing system has a storage track formed of pits alternating with lands along a spiral path. The pit depth introduces a phase change of approximately π/2 radians between portions of a reading beam that impinge upon pits and portions that impinge upon lands adjacent the pits.

9 Claims, 7 Drawing Figures

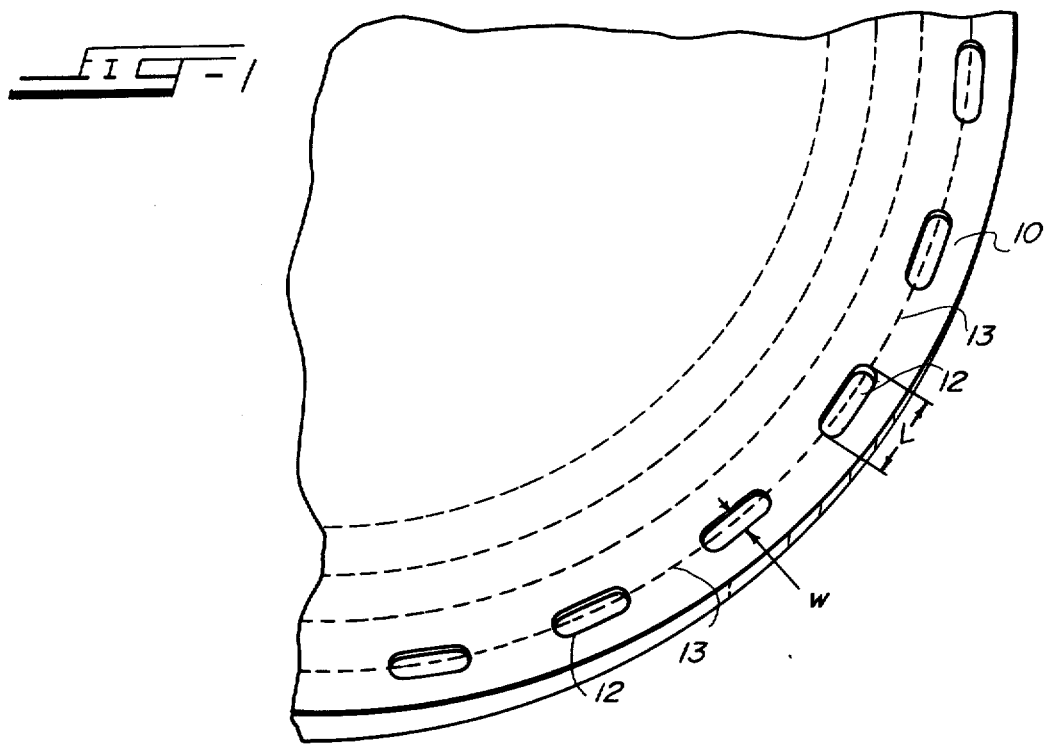
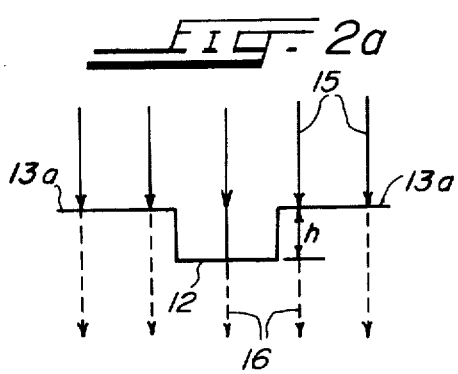
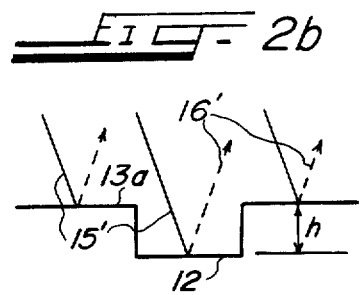
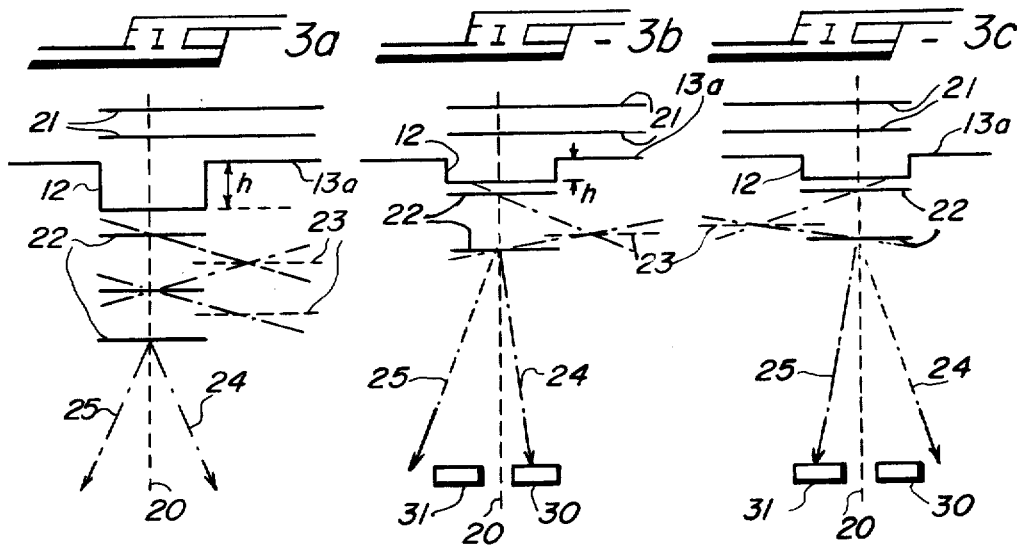

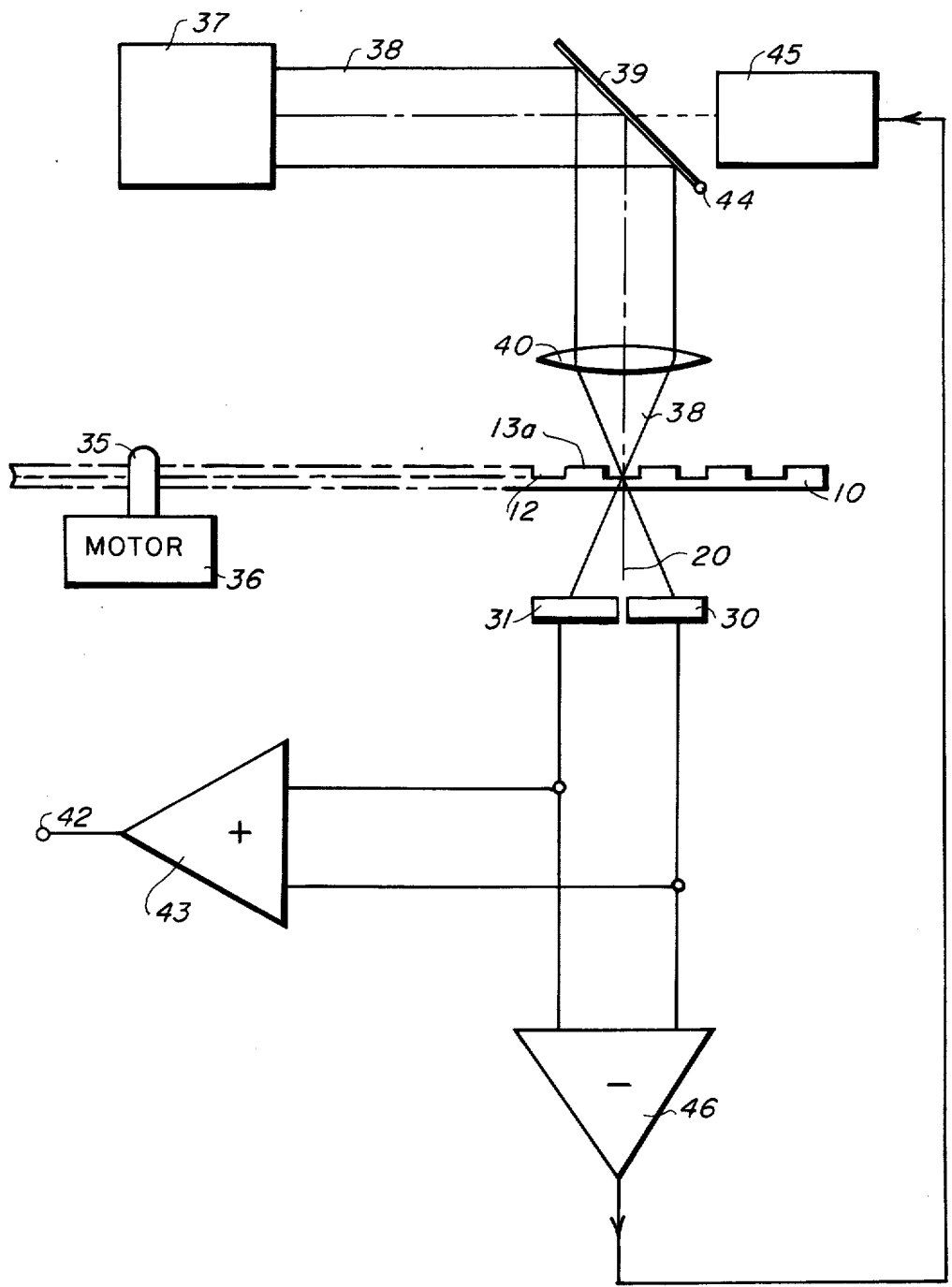

VIDEO DISC

SUMMARY OF THE INVENTION

The invention is directed to the structure of video discs for use in an optical image reproducing system and concerns, more particularly, an improvement in the disc which facilitates tracking control of the reading beam.

Optical image reproducing systems have been proposed as adjuncts to home color television receivers to increase their use by arranging for the play back of recorded program material through such receivers. As heretofore proposed, the program material is stored in a carrier, such as a disc quite similar to well known audio discs, to be read by a beam of energy, usually a laser beam, to develop an electrical signal representative of the stored information. That signal may be processed or transcoded to be suitable for application to the antenna terminals of the receiver. Usually the stored program information has luminance, chroma, audio and synchronizing components positioned in assigned segments of the frequency spectrum convenient for recording in the disc but subject to transformation in a transcoder to the distribution typical of commercial telecasts. Commercial television broadcasting features two interlaced fields for each frame and, in like fashion, the storage track of the disc is a multi-turn spiral with each convolution containing the two fields of an image frame with their synchronizing information.

Program information may be stored in a variety of ways in optical discs including, in particular, the use of a succession of concavities or "pits," as they are frequently referred to, alternating with a like succession of lands and collectively disposed along a spiral path to constitute a storage track for reading by a reading beam. Generally, the pits and lands have a uniform width but their length is variable along the track to the end that the pits and lands comprise a spatial representation of the temporal variations of an angular-velocity (frequency) modulated carrier signal conveying the program material and controlling the formation of the record track in order to store that information in the disc.

The stored information is easily retrived by scanning the storage track with a reading beam and utilizing a photoreceptor to respond to that beam after it has read the track. When the disc is transmissive to the reading beam the photoreceptor is positioned along the beam path to collect a part of the light transmitted through or scattered by the disc. Where the disc is reflective, the photoreceptor is located on the same side of the disc as the source of the reading beam to respond to light reflected from the storage track of the disc. In either case, the pits diffract scatter light of the reading beam causing the photoreceptor to develop an electric signal which is modulated in accordance with the information stored in the disc.

Systems of this type perform satisfactorily, at least from a theoretical viewpoint, but in practice experience difficulty because irregularities and eccentricities which are always encountered result in tracking misregistration of the reading beam. Disc structures of the prior art have not permitted the facility of tracking adjustment that is possible with discs embodying the present invention.

Accordingly, it is a principal object of the present invention to provide an improved video disc for optical image reproducing systems.

It is another and particular object of the invention to improve the structure of video discs to facilitate tracking as the disc is scanned by a reading beam of energy.

A video disc, in accordance with the invention, is especially suited for use in an optical image reproducing system wherein a reading beam scans the disc to derive the information stored in it. The storage track of the disc is comprised of pits alternating with lands and the depth dimension of the pits introduces a phase change of approximately $(n + \frac{1}{2})\pi$ radians between portions of the reading beam which impinge upon the pits and portions which impinge upon lands adjacent the pits, where $n$ is zero or any integer.

BRIEF DESCRIPTION OF DRAWINGS

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIG. 1 is an enlarged fragmentary showing of a video disc constructed in accordance with the invention;

FIGS. 2a, 2b and 3a – 3c are sketches used in explaining properties of video discs; and FIG. 4 is a schematic showing of a playback device for using a video disc.

DESCRIPTION OF PREFERRED EMBODIMENTS

Referring now more particularly to FIG. 1, the disc 10 there represented is formed of a material having the capability of storing information, such as polyvinyl chloride which may store information in a manner generally similar to an audio disc. The disc may be sufficiently thin (4 to 8 mils) to be rotated at a high speed in a technique known as flying the disc for reading purposes or it may be sufficiently thick to be mechanically rigid like an audio record to be rotated on a turntable for read out purposes. The disc may be transmissive to the reading beam, and usually is when transcribed while it is flying, or it may be reflective and frequently is when played back on a turntable. The disc has program information stored in the form of a continuous track which has a generally circular or spiral shaped path which is to be read by a beam of energy, such as a laser, to derive the stored information. The track is made up of a series of pits 12 and lands 13 which alternate along the path and collectively constitute the storage track. As thus far described, the disc is a known prior structure the properties and shortcomings of which, as well as the improvement contributed by the present invention, will be described with reference to FIGS. 2 and 3.

In both instances the disc lends itself to the transmissive and reflective modes. The transmissive embodiment of FIG. 2a has a pit depth h and incident light represented by full-line arrows 15 enters pits 12 as well as disc segments 13a separating runs of pits and responding just as lands 13 to incident light. The emerging light, shown by broken-line arrows 16, is modulated due to the diffractive effect of the pits although, for convenience, that has not been illustrated in this figure. The reflective embodiment of FIG. 2b causes the incident light 15 to be reflected as rays 16'. Assuming the reading beam to be only slightly greater in diameter than the width W of pits 12, and in all events dimensioned to read but a single convolution of the record track at any instant, and further assuming the beam to be in proper tracking registration, centered on the record track, a photo receptor positioned to collect rays 16 or 16' is able to develop an electrical signal representative of the stored information. In this part of the operation the depth h of the pits is no major concern but it does assume a most important role for operating conditions in which the reading beam becomes decentered and tracking adjustment is required. Where the optical path length difference between pits and lands approximates one-half wavelength of the reading beam in the medium of a transmissive disc, as has been the practice in the past, tracking adjustments are exceedingly difficult, whereas a optical path length difference between pits and lands of approximately one-quarter wavelength as taught by the instant invention greatly simplifies tracking.

More specifically and with reference to FIGS. 3a, a pit depth of one-half wavelength results in diffraction of the beam energy in accordance with a scatter pattern that is symmetrical with respect to reference plane 20, a plane normal to the major plane of the disc, through the optic axis and tangent to the record track at the location of the reading beam. In this figure, the full horizontal lines 21 represent the wave front of the approaching reading beam, lines 22 designate the position of the reading beam emerging from pit 12 while broken lines 23 denote the portion of the beam emerging from land 13a for the case in which the beam is decentered, having its center displaced to the right relative to pits 12. Obviously, wave fronts 23 travel through the disc medium a distance h greater than the travel of wave fronts 22 through that medium. The index of refraction n in the medium is greater than the index of refraction (unity) in air or vacuum and, accordingly, wave fronts 23 are delayed relative to wave fronts 22. In the far field, these partial wave fronts give rise to two resultants shown by the dash-dot and the dash-dash-dot construction lines and the corresponding rays are designated by arrows 24 and 25, respectively. Where the depth dimension of the pits introduces a phase change or phase delay of wave fronts 22 and 23 in the near field that is an integral multiple of $\pi$ radians, the directions and amplitudes of rays 24 and 25 are symmetrical with respect to reference plane 20. Consequently, the simple system of two photodiodes symmetrically positioned on opposite sides of plane 20 in the far field is ineffective in developing a radial tracking correction signal since they recieve equal excitation. This condition prevails whenever the beam enters both the pits 12 and lands 13a irrespective of the degree of tracking registration or misregistration and is encountered with the half wave pit discs of the prior art. Of course, FIG. 3a is specific to misregistration in one sense or direction but the same result occurs for misregistration in the opposite sense.

In practicing the invention, the pit depth h is dimensioned to introduce a phase change between wave fronts 22 and 23 having a value of approximately $(k + \frac{1}{2})\pi$ radians, where $k$ is equal to zero or any integer. Where this depth specification is observed, as shown in FIG. 3b, light segments 24 and 25 are asymmetrical with respect to reference plane 20. Therefore, a pair of photoreceptors or photodiodes 30 and 31 symmetrically positioned on opposite sides of plane 20 in the far field receive unequal excitation. With the beam, in effect, decentered to the right as illustrated, diode 30 develops the larger signal and tracking adjustments may be accomplished as described hereafter. In practical executions of such playback systems photodiode 30 will be excited to develop an error correction signal and photodiode 31 will not be excited at all.

For a decentered condition of the opposite sense, the asymmetry of light segments 24, 25 is as shown in FIG. 3c with photodiode 31 receiving the greater excitation. Of course, units 30 and 31 are equally energized during operating intervals in which the reading beam is in proper tracking registration, centered on the storage track of the disc.

Preferably, the pit depth dimension introduces a phase change of $\pi/2$ radians which, for a transmissive disc of polyvinyl chloride or other materials generally used for pressed discs having an index of refraction of about 1.5, is achieved by making the pit depth approximately one-half the wavelength of the reading beam in vacuum. For the reflective disc, the preferred pit depth is approximately one-eighth the wavelength of the reading beam in vacuum. In typical executions for a system employing a helium-neon laser having a light wavelength of 6000A. a representative value for pit depth is 3000A. for a transmissive disc and 750A. for a reflective disc.

FIG. 4 shows an optical image reproducing system which may advantageously utilize the described optical discs. As there represented, disc 10 is transmissive and is centered on a spindle 35 for rotation by a synchronous motor 36. A laser light source 37 directs a reading beam 38 along an optical path to a mirror 39 which redirects the beam to a lens 40 which focuses the beam on the storage track of video disc 10. Photoreceptors 30, 31 are symmetrically positioned on opposite sides of reference plane 20 and on the side of disc 10 opposite that from which the reading beam approaches. The sum of the signals from photodiodes 30 and 31 is representative of the program information stored in the disc and is delivered to an output terminal 42 by way of adding an amplifier 43. Amplifier 43 may include a suitable transcoder or the signal from terminal 43 may be applied to a color receiver through a transcoder.

Radial tracking adjustment may be accomplished by displacing mirror 39 about a pivot 44. Such displacement is under the control of a driver 45, in turn, energized by a radial tracking correction signal developed by subtracting the outputs of photo cells 30 and 31 in a differential amplifier 46. An attractive structure for mirror 39 and driver 45 is described and claimed in a co-pending application of Adler et al., Ser. No. 439,684, now abandoned. It comprises a cantilever mounted piezoelectric bender or bimorph carrying a mirror on its free end. This beam reflecting arrangement in conjunction with the pair of photoreceptors 30, 31 may be included in a very simple and yet effective tracking system for maintaining tracking registration in the reading of discs constructed in accordance with the present invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. For use in an optical image reproducing system of the type in which information stored in a record track of a carrier is derived by scanning said track with a beam of light, a record disc having a record track composed of pits alternating with lands and in which the depth dimension of said pits introduces a phase change of approximately $(k + \frac{1}{2})\pi$ radians between portions of said beam which impinge upon said pits and portions of said beam which impinge upon lands adjacent said pits, where $k$ is zero or any integer.

2. The improvement in accordance with claim 1 in which said carrier is transmissive with respect to said beam of energy.

3. The improvement in accordance with claim 2 in which the depth dimension of said pits introduces a phase change between said portions of said beam substantially equal to $\pi/2$ radians.

4. The improvement in accordance with claim 1 in which said carrier is reflective to said beam of energy.

5. The improvement in accordance with claim 4 in which the depth dimension of said pits introduces a phase change between said portions of said beam substantially equal to $\pi/2$ radians.

6. The improvement in accordance with claim 5 in which the depth dimension of said pits is approximately equal to one-eighth wavelength of said beam of energy in vacuum.

7. The improvement in accordance with claim 3 in which the index of refraction of the medium of said carrier is approximately 1.5 and in which the depth of said pits is approximately equal to one-half wavelength of said beam of energy in vacuum.

8. For use in an optical image reproducing system of the type in which information stored in a record track of a carrier is derived by scanning said track with a light beam of a predetermined wavelength, a record disc which is transmissive of said light beam with an index of refraction of approximately 1.5 and having a record track composed of pits alternating with lands, and in which the depth dimension of said pits is at least approximately equal to one-half said predetermined wavelength.

9. For use in an optical image reproducing system of the type in which information stored in a record track of a carrier is derived by scanning said track with a light beam of a predetermined wavelength, a record disc which is reflective to said light beam and has a record track composed of pits alternating with lands, and in which the depth dimension of said pits is substantially equal to one-eighth of said predetermined wavelength.

* * * * *